United States Patent [19]

Beigl

[11] 4,326,774
[45] Apr. 27, 1982

[54] SNAP-ON CONVEX REAR VIEW MIRROR FOR BICYCLES

[76] Inventor: William Beigl, 2521 W. Montrose, Chicago, Ill. 60618

[21] Appl. No.: 202,365

[22] Filed: Oct. 29, 1980

[51] Int. Cl.³ .............................................. G02B 5/10
[52] U.S. Cl. .................................. 350/307; 248/477; 248/481
[58] Field of Search ..................... 350/97–99, 350/288, 293, 307; 248/466, 475 R, 478, 476, 479, 481, 477, 496; 280/289 R, 289 A, 289 H

[56] References Cited

U.S. PATENT DOCUMENTS

| 702,763 | 6/1902 | Aurness | 350/307 X |
| 2,903,297 | 9/1959 | Zbikowski | 248/479 X |
| 3,843,236 | 10/1974 | Kurz, Jr. | 350/307 |
| 3,995,945 | 12/1976 | Addicks | 350/307 |

FOREIGN PATENT DOCUMENTS

| 228441 | 5/1960 | Australia | 350/307 |
| 627998 | 3/1936 | Fed. Rep. of Germany | 350/293 |
| 844056 | 8/1960 | United Kingdom | 350/307 |

*Primary Examiner*—F. L. Evans
*Attorney, Agent, or Firm*—Charles J. Speciale

[57] ABSTRACT

A convex rear view mirror for removable attachment to a suitable support bracket therefor mounted on a bicycle, comprising the convex mirror, a positioning element for adjusting the mirror, and a tapered open shaft for snap-on insertion into an opening in said support bracket.

2 Claims, 2 Drawing Figures

SNAP-ON CONVEX REAR VIEW MIRROR FOR BICYCLES

BACKGROUND OF THE INVENTION

1. Field of the Invention

This invention relates to rear view mirrors and more particularly to convex rear view mirror for bicycles.

2. Description of the Prior Art

The concept of adjustable rear view mirrors convex or otherwise is of course, known for moving vehicles and bicycles among other uses. Some of these are disclosed in U.S. Pat. Nos. 516,910 (bicycles); 1,114,559 (vehicles); 1,992,233 (photography); 2,257,510 (vehicles); 3,337, 285 (vehicles); and 3,316,052 (stores and other public places). None of the foregoing, however, disclose the concept of a snap-on mirror mountable to a support frame therefor, in a manner according to the invention.

SUMMARY OF THE INVENTION

It is, therefore, among one of the principal objectives of this invention to provide just such a snap-on rear view mirror as aforementioned.

In accord with the present invention there is now provided a convex rear view mirror for removable attachment to a suitable support bracket therefor mounted on a bicycle, which comprises a convex mirror positioning portion for adjusting the mirror, and a tapered open shaft portion adapted for snap-on insertability into an opening in said support bracket.

BRIEF DESCRIPTION OF THE DRAWINGS

The invention will be hereinafter more fully described with reference to the accompanying drawings, in which.

DESCRIPTION OF THE PREFERRED EMBODIMENT

Figure 1:
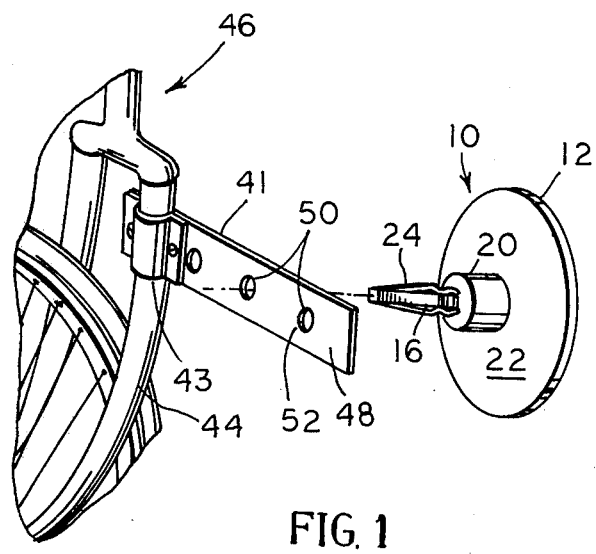
FIG. 1 is a view in perspective of the invention mirror in exploded juxtaposition with its support frame with only a portion of the bicycle, to which the support frame is attached, shown.
Figure 2:
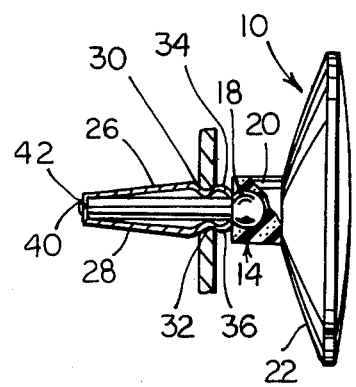
FIG. 2 is a side elevational view, partially sectional, with part of the mirror cut away, and showing the mirror snapped into position.

Referring now to the figures of the drawing, there is shown therein the convex rear view mirror 10 of the invention which comprises a convex mirror portion 12, a positioning element 14 comprising a post 16 with a ball 18 on the end of the post, the ball 18 being engaged in a universal joint bearing 20 which is joined to rear face 22 of the convex mirror. Positioning element 14 is conventional, however, what is not conventional, and which is a critical feature of the invention, is the tapered open shaft 24 which is clamped tightly over post 16. Shaft 24 has a pair of spaced opposing upper and lower walls 26 and 28, respectively, which taper outwardly towards the ball 18 and then both curve in inwardly towards the post mergingly forming upper and lower slots 30 and 32, respectively, with the terminal arc-like curved portions 34 and 36, respectively, of the walls 26 and 28. A base end 40 of shaft 24 abuts smoothly against the end 42 of post 16. Shaft 24 is bonded to the post 16 wherever there is any contact between the respective parts thereof. This can be done by soldering or welding or cementing. These points of contact are base end 40 to end 42, slots 30 and 32 forcing the walls into clamping contact with the post and the points where the walls 26 and 28 terminate inwardly upon the post 16 just below ball 18. Shaft 24 has a certain amount of flexibility for a reason to be described.

A support bracket 41 is conventionally clamped as at 43 to the fork 44 of a bicycle 46 (only partially shown). Bracket 41 is an elongated bar 48 extending outwardly from, and at right angles to, the fork 44. A number of linearly spaced holes (in this illustration, three) 50 are provided in the bar 48. The mirror 10 of the invention is removably attachable to the support bracket 40 by forcing shaft 24 into one of the holes 50 until it snap locks into place via slots 30 and 32 surrounded by the wall 52 of the hole 50. By virtue of its flexibility shaft 24 can be squeezed just below the slots 30 and 32 with one hand and the mirror pulled out of the hole on the bracket with the other hand. Similarly, by virtue of its flexibility shaft 24 can be forced into the holes 50. This removably attachable feature can prevent theft of the mirror when the bicycle is parked and unattended.

Support bracket 41 can be metal or plastic as can shaft 24 and positioning element 14. What is important is that the shaft 24 be tensionally flexible.

What is claimed is:

1. A convex rear view mirror for removable attachment to a support bracket therefor mounted on a bicycle which comprises a convex mirror portion, a mirror positioning portion for adjusting said mirror, and a tapered open shaft portion, said bracket further comprising an elongated bar having at least one opening therein, said tapered open shaft being insertable into said opening and said tapered open shaft having snap-on means for removably engaging said elongated bar of said support bracket, wherein said mirror positioning portion further comprises a post, a ball on one end of said post, and a universal joint bearing, said ball being engaged in said universal joint bearing, said mirror positioning portion being joined to said mirror, said shaft fitting over said post and further comprising a pair of spaced opposing upper and lower walls and a pair of spaced opposing based ends, said shaft closed at one based end and open at the other based end, said walls tapering outwardly towards said ball then curving inwardly towards said post mergingly forming upper and lower slots with terminal arc-shaped portions at the other based open end of said opposing walls, said slots forming the snap-on means for removably engaging said opening in said elongated bar.

2. A mirror according to claim 1, wherein said shaft is permanently mounted to said post, said shaft being formed of a tensionally flexible material rendering it removably attachable to said elongated bar.

* * * * *